United States Patent
Nobusawa

[15] 3,657,979
[45] Apr. 25, 1972

[54] AUTOMATIC EXPOSURE CONTROLS FOR CAMERAS

[72] Inventor: Tsukumo Nobusawa, Tokyo, Japan
[73] Assignee: Asahi Kogaku Kogyo Kabushiki Kaisha, Tokyo-to, Japan
[22] Filed: June 30, 1970
[21] Appl. No.: 51,165

[30] Foreign Application Priority Data

July 5, 1969    Japan..................................44/52968

[52] U.S. Cl. ..........................................................95/10 CT
[51] Int. Cl. ..........................................................G01j 1/46
[58] Field of Search ..........................95/10 C, 10 CT, 10 CE

[56] References Cited

UNITED STATES PATENTS

| 3,324,779 | 6/1967 | Nobusawa | 95/10 C X |
| 3,464,773 | 9/1969 | Waz | 95/10 C X |
| 3,347,141 | 10/1967 | Nobusawa | 95/10 C |
| 3,245,332 | 4/1966 | Kagan | 95/10 C X |
| 3,504,601 | 4/1970 | Schubert | 95/10 C |

Primary Examiner—Samuel S. Matthews
Assistant Examiner—Monroe H. Hayes
Attorney—Steinberg & Blake

[57] ABSTRACT

A camera capable of having the exposure of film therein determined automatically. A shutter actuator is provided for first opening the shutter to start an exposure and for then closing the shutter to terminate the exposure, and a shutter circuit coacts with the shutter actuator to start measuring of an exposure time interval when the shutter is opened and to operate the shutter actuator to close the shutter after elapse of an exposure time which will provide a proper exposure. The shutter circuit is transistorized and includes a triggering capacitor for triggering the shutter circuit to bring about closure of the shutter. A storage circuit is provided for storing information which includes the factor of the intensity of the light received from the object which is photographed, and this storage circuit includes a storage capacitor the charge of which is indicative of the light intensity. A control circuit is connected electrically both with the storage circuit and with the shutter circuit for triggering the latter through the triggering capacitor, to bring about closing of the shutter, in accordance with the charge at the storage capacitor.

10 Claims, 4 Drawing Figures

INVENTOR
TSUKUMO NOBUSAWA

AUTOMATIC EXPOSURE CONTROLS FOR CAMERAS

BACKGROUND OF THE INVENTION

The present invention relates to cameras.

In particular, the present invention relates to cameras capable of automatically determining the extent to which film in the camera is exposed.

Thus, the invention is applicable to that type of camera which will automatically determine exposure time in accordance with other factors, such as the intensity of the light received from the object which is photographed, the film speed, and the size of the diaphragm aperture. Thus, there are known single-lens reflex cameras where the shutter is electrically controlled in accordance with factors one of which involves the intensity of the light measured by a photosensitive element which receives only light which has already passed through the objective of the camera. During actual exposure of the film, which is to say, during the time which the shutter is open, the impingement of light on the photosensitive element is interrupted. Thus, the information which is to determine the exposure will be temporarily stored, this information including, of course, the light intensity of the object which is to be photographed and which has been sensed by the photosensitive element just prior to opening of the shutter.

Conventional structures of this latter type are exceedingly complex. Thus, a structure of this latter type requires in the circuits thereof additional operations such as logarithmic conversion of the information signals, although complications of this latter type are not required when using a photosensitive element which measures light exterior to the objective. Also, the storage of information requires bleeder circuits and the circuits must be closed for a considerable period of time longer than the actual time just prior to and during exposure of the film. Thus, with the known constructions there is an undesirable consumption of power and complex switching mechanisms.

SUMMARY OF THE INVENTION

It is accordingly a primary object of the invention to provide circuitry which is greatly simplified as contrasted with the known structures.

In particular, it is an object of the present invention to provide an exceedingly improved circuit for storage of information such as the intensity of light received from the object which is photographed.

Thus, it is a particular object of the invention to provide storage of information without requiring the use of a bleeder circuit.

Also, it is an object of the invention to provide a construction which enables all of the stored information to be received and stored just prior to actual exposure of the film.

Thus, it is an object of the invention to provide a construction which will enable a considerable saving of power to be achieved.

Also, it is an object of the invention to provide a construction where the switching mechanisms are considerably simplified as compared with known constructions.

Furthermore, it is an object of the invention to provide with an internal measurement of light which has already passed through the objective an information-storage circuit which can operate in a manner similar to systems which measure light external to the objective so that no additional operations such as logarithmic conversion of the information signal is required in connection with the storage of the information.

According to the invention, a shutter-actuating means is provided for bringing about first opening of the shutter and then closing of the shutter. A shutter circuit means coacts with the shutter-actuating means for responding to opening of the shutter to measure elapsed time and to bring about closing of the shutter by the shutter-actuating means after elapse of an exposure time which will provide a proper exposure for the particular photographic conditions. A storage circuit means is provided for storing information which includes the intensity of the light received from the object which is photographed, and a control circuit means of the invention is electrically connected with the storage circuit means and the shutter circuit means for controlling the latter to bring about closure of the shutter in accordance with the information which is stored by the storage circuit means. The shutter circuit means includes transistors which are triggered to bring about shutter closure, and these transistors are controlled by a triggering capacitor. The storage circuit means includes a storage capacitor where the information is stored. The control circuit means brings about triggering of the shutter circuit means through the triggering capacitor thereof in accordance with the charge at the storage capacitor.

BRIEF DESCRIPTION OF DRAWINGS

The invention is illustrated by way of example in the accompanying drawings which form part of this application and in which.

DESCRIPTION OF PREFERRED EMBODIMENTS

Figure 1:
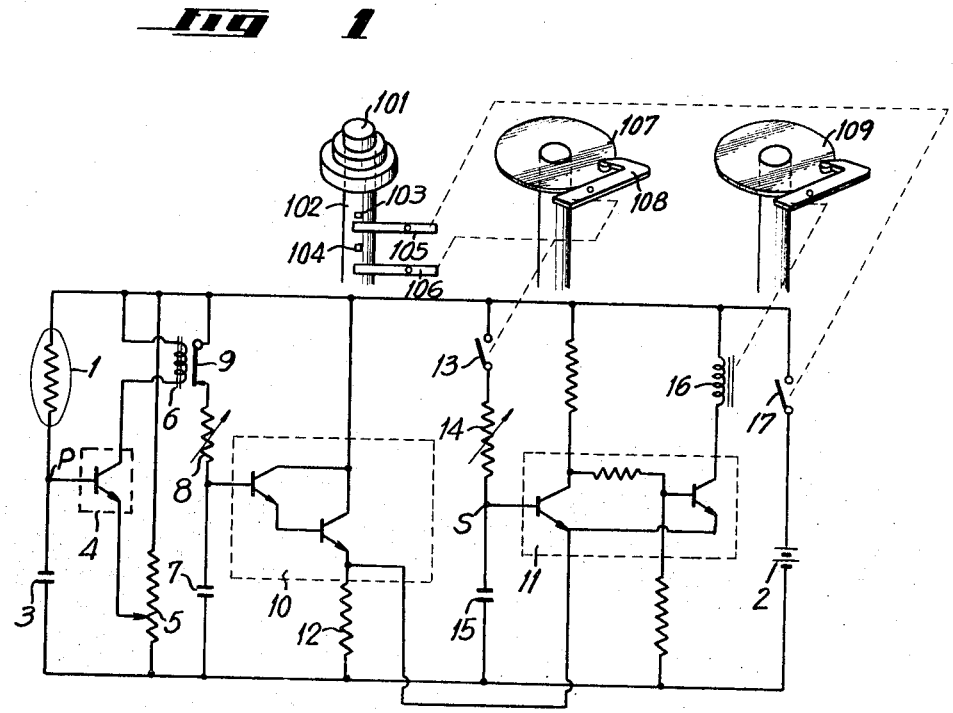
FIG. 1 is a wiring diagram of one embodiment of the invention, FIG. 1 schematically illustrating shutter structure and the connection thereof with the illustrated circuit.

Referring to FIG. 1, a photosensitive means 1 shown at the upper left part of FIG. 1 is positioned in the interior of a single-lens reflex camera to receive light which has already passed through the objective so as to provide a signal determined by the intensity of the light which is received from the object which is to be photographed. Such photosensitive means are well-known, and also the manner in which they are mounted in the interior of the camera is well-known. The photosensitive means 1 is electrically connected in series with a timing capacitor 3 so as to form therewith a timing circuit. The illustrated circuit includes a battery 2 which forms a source of power for the circuit. A switching transistor circuit 4 has its base input pole electrically connected with the voltage at the node or junction P between the electrically conductive photosensitive means 1 and the timing capacitor 3, so that the switching transistor circuit 4 will provide a triggering voltage. The emitter voltage at the trigger level voltage may be adjusted by way of a potentiometer 5. The collector of the switching transistor circuit 4 is connected with the coil of a relay 6 which is thus connected in series with the collector of the transistor circuit 4. The relay 6 includes a normally closed switch 9 connected in series with a storage capacitor 7 which with the above elements forms a storage circuit means according to which there will be stored at the capacitor 7 information which includes the factor of the intensity of the light impinging on the photosensitive means 1. This storage circuit means includes a variable resistor 8 connected in series between the capacitor 7 and the relay. The variable resistor 8 may be adjusted for introducing the factor of film speed, for example. Thus, the charging circuit connected to the storage capacitor 7 includes a structure not only for storing information according to light intensity but also to other exposure-determining factors such as the factor of film speed introduced through suitable adjustment of the variable resistor 8. The above storage circuit means is electrically connected with a control circuit means 10 which acts as a transistor amplifying circuit in the illustrated example, this amplifying circuit 10 being of high input impedance and having control poles across which a terminal of the storage capacitor 7 and an output terminal Q are connected. The control circuit means 10 is electrically connected not only with the storage circuit means but also with a shutter circuit means described below and having a transistorized triggering circuit 11 triggered by a triggering capacitor 15 of the shutter circuit means. The transistor of the circuit 11 whose base is connected to a voltage varying point S between capacitor 15 and a variable resistor 14 connected in series with the latter capacitor, has its emitter connected electrically with the output terminal Q of the control circuit means 10. A common emitter resistor 12 is electrically connected to the output terminal Q, so that in this way the single resistor 12 can be used for both of the circuits 10 and 11.

The shutter circuit means includes a starting switch 13 which is closed, in a manner described below, in synchronism with opening of the shutter, so that the shutter circuit means only starts to operate when the shutter opens. Thus, operation of the shutter control circuit starts simultaneously with exposure of the film. As may be seen from FIG. 1, upon closing of the switch 13, a timing circuit which includes the variable resistor 14 and the series-connected capacitor 15 is set into operation. The triggering circuit 11 is connected to the voltage varying point S, as pointed out above, and this trigger circuit 11 is also connected with an electromagnet 16 which maintains the shutter open until the electromagnet is deenergized in the manner described below. The entire circuit is closed by a switch 17 which is closed by the operator just prior to opening of the shutter.

Thus, as is schematically illustrated in FIG. 1, there is available to the operator a manually operable means for operation just prior to opening of the shutter, as well as for bringing about opening of the shutter so as to start the exposure. This manually operable means includes a shutter button 101 accessible to the operator and situated at the top end of a plunger 102 which is moved down by the operator when an exposure is to be made. The plunger 102 fixedly carries a pair of operating pins 103 and 104, and a swingable lever 105 is swung by the pin 103 during the initial part of downward movement of the plunger 102 while the lever 106 is swung by the pin 104 only after an initial increment of movement of the plunger 102 has taken place. It will be noted that the lever 105 is linked to, or in other words, operatively connected with, the switch 17 for closing the latter during the initial part of movement of the manually operable means, so that just prior to opening of the shutter the circuit through the power source 2 is closed. The continued displacement of the plunger 102 will then bring about turning of the lever 106.

Schematically represented in FIG. 1 is a focal plane shutter having a rotary component 107 which is illustrated in its cocked position and which runs down to open the shutter. This shutter, as is well-known, has a second rotary component 109 which brings about closing of the shutter when the element 109 runs down. These components 107 and 109 are shown in their cocked positions in FIG. 1, and they form part of a shutter actuating means which includes the operating levers 108 and 110. The lever 108 is shown in a position holding the component for controlling the leading shutter curtain with this component cocked and the shutter closed, while the lever 110 is shown in FIG. 1 holding the component 109 which controls the trailing shutter curtain also in its cocked position. The arrangement is such that the electromagnet 16 maintains the lever 110 in the position which maintains the trailing curtain, through component 109 in a position ready to run down and close the shutter. As soon as the electromagnet 16 becomes deenergized, the lever 110 releases component 109 so that the trailing curtain will close the shutter. The turning of the lever 106 by the pin 104 displaces the lever 108 away from the component 107 so that the leading curtain of the shutter will run down to open the shutter and start the exposure. It will be noted that the switch 13 is also connected with the lever 106 to be actuated in synchronism with the lever 108 for closing the timing circuit which includes the triggering capacitor 15 simultaneously with the opening of the shutter.

Figure 2:
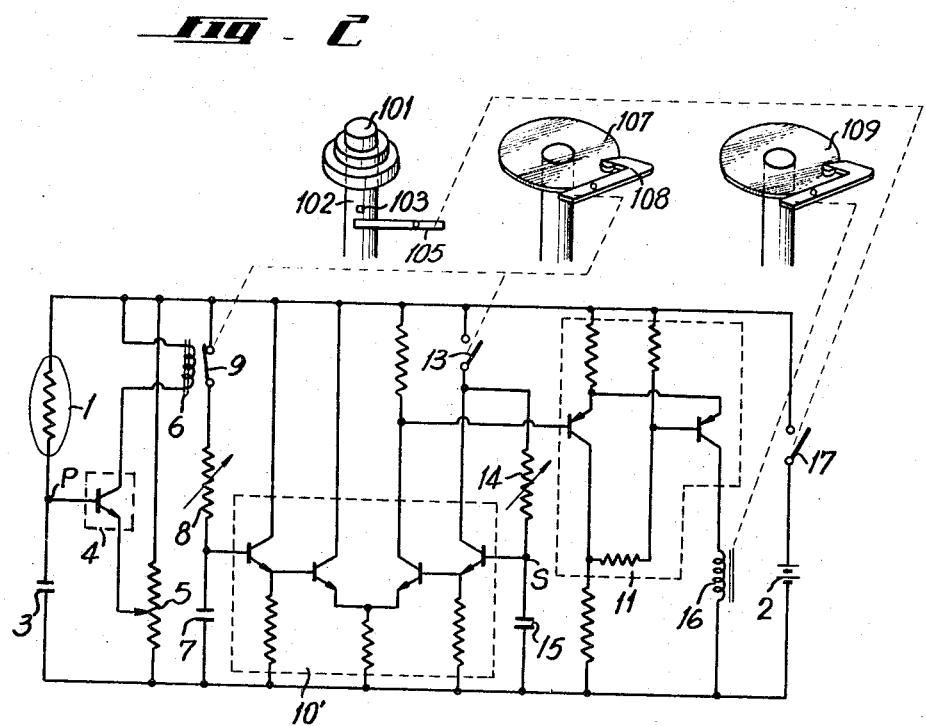
FIG. 2 shows a different embodiment of a circuit of the invention.

Referring now to FIG. 2, the embodiment of the invention which is illustrated therein differs from that of FIG. 1 in that instead of providing a control circuit means in the form of an amplifying circuit 10, the control circuit means of this embodiment is in the form of a comparison circuit 10'. This circuit 10', as is apparent from FIG. 2, brings about a comparison between the terminal voltage of storage capacitor 7 and the voltage at the varying point S of the timing circuit, providing in this way a comparison signal output from the circuit 10' which controls the shutter circuit means of FIG. 2 which is identical with the shutter circuit means of FIG. 1, including also the series-connected variable resistor 14, triggering capacitor 15 and triggering circuit 11.

Considering the operation in greater detail, and referring to FIG. 1, it will be seen that when the switch 17 is closed during the initial increment of depression of the shutter button 101, the timing capacitor 3 will begin to be charged in accordance with a control derived from the resistance value of the photosensitive conductor 1, this latter value being determined in accordance with the intensity of the light received from the object which is photographed. At the same time the storage capacitor 7 begins to be charged through the normally closed switch 9 of the relay 6. This charging, however, takes place under the additional control of the resistance value of the variable resistor 8 which is set by the operator according to the value of the speed of the film which is exposed. At this time the capacitor 15 of the timing circuit portion of the shutter circuit means is still not charged because the synchronous switch 13 remains open. In other words, at this time the shutter opening has not yet taken place.

The terminal voltage $V_{c1}$ of the timing capacitor 3 and the terminal voltage $V_{c2}$ of the storage capacitor 7 may be determined according to the following formulas relative to the time which has elapsed from the point at which charging begins:

$$V_{c1} = E\left(1 - e^{-\frac{t}{R_1 C_1}}\right) \tag{I}$$

$$V_{c2} = E\left(1 - e^{-\frac{t}{R_2 C_2}}\right) \tag{II}$$

where E is indicative of the voltage of the battery 2, $R_1$ is the resistance value of a photosensitive conductor 1, $R_2$ is the resistance value of the variable resistor 8, $C_1$ is the capacity of the timing capacitor 3, and $C_2$ is the capacity of the storage capacitor 7.

Thus, the timing capacitor 3 has begun to be charged under the control of the resistance value of the photosensitive conductor 1 according to the intensity of the light received from the subject which is photographed. When the charge of the timing capacitor 3 reaches a predetermined trigger voltage $V_{c1}$, after elapse of a time $t$ starting with the closing of the switch 17, the transistor switching circuit 4 transfers from the non-conductive to the conductive state. The result is that the relay 6 becomes energized, and this energizing of the relay 6 displaces the normally closed switch 9 to an open position. Thus, the charging of the storage capacitor 7 of the storage circuit means is terminated and determined in accordance with the light intensity and the duration of the charging from the moment when the switch 7 is closed up to the responding of the relay 6 to the change-over of the transistor circuit 4 from the non-conductive to the conductive state.

This elapsed time $t$ is, from the formula I, given as $$t = R_1 C_1 l_n \frac{E}{E - V_{c1'}} \tag{III}$$

and the terminal voltage $V_{c2'}$ of the storage capacitor 7 at this moment may be expressed as indicated below by substitution of the above formula III into the formula II:

$$V_{c2'} = E\left(1 - e^{-\frac{1}{R_2 C_2} \times R_1 C_1 l_n \frac{E}{E - V_{c1'}}}\right)$$

$$= E\left(1 - e^{-\frac{R_1 C_1}{R_2 C_2} l_n \frac{E}{E - V_{c1'}}}\right)$$

$$= E\left\{1 - \left(\frac{E}{E - V_{c1'}}\right)^{-\frac{R_1 C_1}{R_2 C_2}}\right\} \tag{IV}$$

The source voltage E and the trigger voltage $V_{c1}$, are given so that the relation $$\frac{E}{E-V_{c1'}} = e \text{ (where } e \text{ is the natural logarithm base)}$$

is established on the assumption that $$(C_1/R_2C_2) = K.$$

The terminal voltage $V_{c2'}$ of the storage capacitor 7 expressed by the formula IV may be, therefore, expressed as follows:

$$V_{c2'} = E(1 - e^{-KR_1}) \quad \text{(V)}$$

The operation which occurs during the initial increment of movement of the manually operable means just prior to opening of the shutter is completed in an instant, although the stored information depends upon the intensity of the light travelling from the object which is photographed. Therefore, this initial phase of the operation is very reliably completed just prior to opening of the shutter which takes place during the continued downward movement of the plunger 102, as described above.

In synchronism with the opening of the shutter the synchronous switch 13 is closed, so that the triggering capacitor 15 now begins to be charged, and this charging takes place under control of the resistance value which has been set into the variable resistor 14 by the operator in accordance with a factor such as the size of the diaphragm aperture. The terminal voltage $V_{c3}$ of the capacitor 15 rises as time elapses, and the triggering circuit 11 of the shutter circuit means has its emitter output terminal common to the emitter output terminal Q of the control circuit means 10. In this way, the control circuit means provides a control of the flowing current according to the electrical charge of the storage capacitor 7. Thus, the transient current is controlled by the control circuit means 10 in accordance with an operative reversal of the electrical charge at the storage capacitor 7, with the triggering circuit 11 now responding in such a way that the final transistor thereof which is initially conductive so as to maintain the electromagnet 16 energized becomes non-conductive when the triggering of the capacitor 7 results in rendering the initial transistor, connected to the point S, conductive, so that the electromagnet 16 is deenergized at the instant when the triggering circuit 11 is triggered by the capacitor 15. The deenergizing of the electromagnet 16 will result in release of component 109 by the lever 110 so that the trailing curtain will run down in order to close the shutter and terminate the exposure.

The latter operations take place when the terminal voltage of the capacitor 15 is:

$$V_{c3} = E\left(1 - e^{-\frac{T}{R_3C_3}}\right) \quad \text{(VI)}$$

where $T$ is indicative of the exposure time which is automatically determined by the above circuitry of the invention, $R_3$ is the resistance at which the variable resistor 14 is set, and $C_3$ is the capacity of the capacitor 15 which reaches the triggering voltage on the condition that the trigger level voltage $V_{c2}$, corresponds to the voltage $V_{c2}$ at the output terminal Q. The shutter, which has thus been maintained open by the energized electromagnet 16 is now free to be closed.

Thus, with the above arrangement the transistor switching circuit 11 which controls the instant of shutter closure uses the output of the timing circuit which includes the triggering capacitor 15, and this circuit is responsive to the exposure-determining factors such as the film speed, the size of the diaphragm aperture, and the intensity of light received from the photographed object, thus providing a triggering voltage with the trigger level determined by the latter factors, and the value of the time T at this point is obtained from the formula VI as:

$$T = R_3 C_3 \ln \frac{E}{E - V_{c3}} \quad \text{(VII)}$$

and, assuming that $$\ln \frac{E}{E - V_{c3}} = b \quad \text{(VIII)}$$

where $b$ is indicative of the parametric constant varying in the form of a progression of multiples, this formula VIII may be transformed as $$V_{c3} = E(1 - e^{-b}) \quad \text{IX.}$$

During the operation of the above-described structure of the invention, the transistorized trigger circuit 11 of the shutter circuit means operates in a reverse manner or, in other words, is triggered when the triggering voltage $V_{c3}$ thereof reaches the trigger level $V_{c2'}$, namely, when $V_{c3} = V_{c2'}$, so that the formulas V and IX provide a new formula, as follows:

$$E(1 - e^{-b}) = E(1 - e^{-KR_1}) \quad \text{X.}$$

As is obvious from the above formula X, $b = KR_1$, and K is a constant value and $R_1$ is indicative of the resistance value of the photosensitive conductor 1, so that with the apparatus of the invention as is apparent from formula X, it is possible to properly determine the value of the time T according to the intensity of the light passing from the object which is photographed and sensed by the photosensitive conductor 1. Furthermore, this value of the time T is determined over a widely varying range of light intensity from the object which is photographed, within the maximum range of light intensity which can be sensed by the photosensitive conductor 1.

On the other hand, with the embodiment which is shown in FIG. 2, the comparison circuit 10' compares the terminal voltages of the storing capacitor 7 and the triggering capacitor 15, both of these capacitors having the same functions as those described above in connection with the embodiment of FIG. 1 where the operation of charging of the capacitors 7 and 15 is set forth. Thus, with the circuit of FIG. 2 when the difference between the compared voltages of these capacitors reaches a predetermined value, a triggering signal is supplied to the triggering circuit 11 of the shutter circuit means, and at this instant the electromagnet 16 becomes deenergized just as described above in connection with the embodiment of FIG. 1. so that the shutter is closed and the exposure is terminated.

It is to be noted in connection with FIG. 2, that in this embodiment instead of providing opening of the shutter through the plunger 102, the shutter is opened simultaneously with the opening of the switch 9 when the relay 6 becomes energized. Through this switch 9 a linkage is operated to close the switch 13 and open the shutter simultaneously with the energizing of the relay 6. Otherwise, in other words, except for the control circuit means 10' and the control of the switch 13 and shutter opening by way of the relay 6, the embodiment of FIG. 2 is the same as that of FIG. 1.

Figure 3:
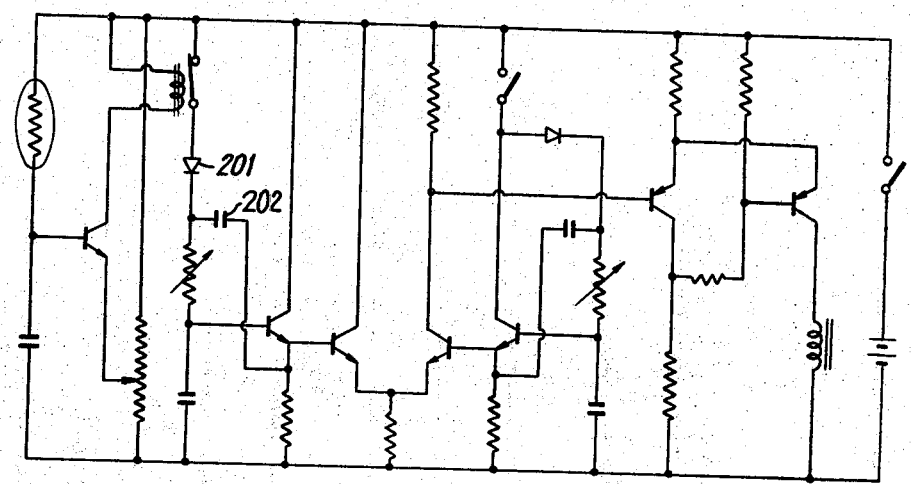
FIG. 3 illustrates a third possible embodiment of a structure of the invention.

The embodiment of the invention which is illustrated in FIG. 3 operates on the same basic principles as those which apply to FIGS. 1 and 2, particularly the embodiment of FIG. 2, since the embodiment of FIG. 3 includes a comparison circuit 10' which forms the control circuit means of this embodiment also. It will be noted that the circuitry and structure illustrated in FIG. 3 correspond very largely to the circuitry and structure of FIG. 2, and the controls are brought about in the manner described above. In FIG. 3, however, a diode 201 and a capacitor 202 are additionally provided in the storage circuit means which includes the variable resistor 8 and the storage capacitor 7. Therefore, the storage circuit means includes a bootstrap circuit of positive feedback emitter voltage type.

The shutter circuit means of FIG. 3 has a diode 203 and a capacitor 204 operatively connected into the circuit of the series-connected elements 14 and 15 referred to above, in much the same way that the diode 201 and the capacitor 202 are connected into the circuit of the series-connected elements 7 and 8. Thus, this same type of positive feedback is provided for the shutter circuit means of FIG. 3.

With this embodiment, the electrical signals are directly proportional to time (the signals being $V_{c2}$ and $V_{c3}$ in this case). It is possible, therefore, to achieve a convenient and accurate addition of exposure factors other than intensity of light from the object which is photographed (such as the selected size of the diaphragm aperture and the speed of the film which is exposed), by varying the resistance values of the variable resistors 8 and 14. Except for these differences, the embodiment of FIG. 3 is identical with that of FIG. 2.

Figure 4:
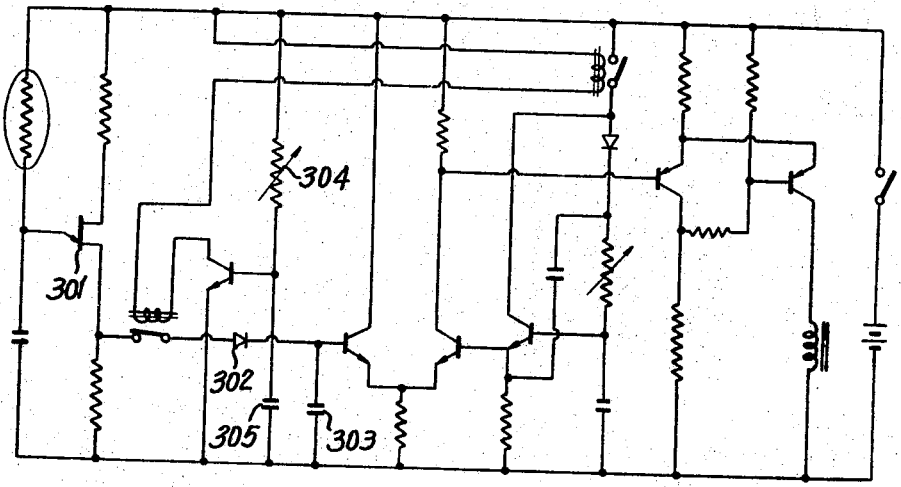
FIG. 4 illustrates a fourth embodiment of a structure according to the invention.

The embodiment of the invention which is illustrated in FIG. 4 differs from the above embodiments in each of which the time during which the storage capacitor 7 is charged is determined by the interval during which the transistor 4 remains nonconducting. With the embodiment of FIG. 4, instead of a switching transistor 4, a uni-junction transistor 301 is used. This transistor 301 will thus produce pulse signals according to the periodically conducting time intervals of the transistor 301, and these signals which have a small quantity of electricity are successively stored through a diode 302 into a storage capacitor 303 of the storage circuit means of this embodiment. Thus, with the embodiment of FIG. 4 the storage capacitor 303 will have an electrical charge in accordance with the number of pulse signals received from the transistor 301.

With the circuit of FIG. 4, the time interval during which the pulse signals are produced is maintained constant under control of a timing circuit formed by the resistor 304 and the capacitor 305. Thus, there will be a constant time interval during which there will be stored at the capacitor 303 a number of pulse signals, and this latter number is determined in accordance with the intensity of the light travelling from the object which is photographed during the period when the pulse signals are stored. With this arrangement the greater the number of pulses the greater the light intensity and the smaller the number of pulses the smaller the light intensity, so that the result is that the electrical charge or the terminal voltage of the storage capacitor 303 depends upon the intensity of the light received from the object which is photographed. It is thus apparent that the photosensitive conductor 1 and the resistor 304 may be effectively replaced in the corresponding circuit. In this case, a transistor affected by pulse signals of a certain amplitude is located between the pulse signals of a certain amplitude is located between the pulse signal generating circuit and the storage capacitor 303, whereby it becomes possible to charge said storage capacitor 303 with predetermined electricity. Inasmuch as the terminal voltage is this embodiment corresponds to the sum of the pulse signals, this terminal voltage is directly proportional to the intensity of the light received from the object which is photographed, even though the signals are non-continuous. The control circuit means 10' and the shutter circuit means of FIG. 4 are identical with those of FIG. 3, as is apparent from a comparison of FIG. 3 and 4. It will be noted, however, that with the embodiment of FIG. 4 and switch 13 forms part of a relay whose coil is connected in series with the coil of the relay 6, so that when the relay 6 becomes energized to open the switch 9 and terminate the charging of the storage capacitor 303 the normally open switch 13 will be closed in order to start the operation of the shutter circuit means simultaneously with the opening of the shutter, as described above.

It is apparent from the above-described embodiment of FIG. 4 that it is possible to use pulse signals for storage of information, and, accordingly, it is possible to provide a modification of this embodiment according to which a multi-oscillator circuit replaces the oscillating circuit of the storage circuit means which includes the uni-junction transistor. Although all of the above-described embodiments use for the shutter circuit means a timing circuit which includes the variable resistor 14 and the triggering capacitor 15, which is of such a type that the timing operation is accomplished through the charging of the latter capacitor, the CR timing circuit which accomplishes its timing operation through discharge of the capacitor may be applied also to the above circuitry of the invention since the CR timing circuit of the latter type is the equivalent of the former type. It is required, of course, that in this latter case the trigger circuit 11 be converted by reversing the polarity of the transistor therein, changing the point to which the synchronous switch 13 is connected.

Thus, with the above-described embodiments of the invention, the storage capacitor 7 of the storage circuit means is charged, in the embodiments of FIGS. 1-3, for a time responsive to the intensity of the light which passes from the subject to be photographed, under the control of the photosensitive conductor 1, and the value of the exposure time is determined by the triggering level voltage relative to the trigger voltage provided by the triggering or timing capacitor 15, thus bringing about while the shutter remains open an electrical operation which will result in closure of the shutter after a proper exposure time. Thus, in the case of a photosensitive means which measures light which has already passed through the objective, the photosensitive conductor 1 included in the above-described embodiments of the invention is situated in the path of light which travels from the objective and which is received from the object which is photographed, the information which is stored in accordance with the intensity of the light being received at the storage capacitor 7 which provides the signal for determining the trigger level relative to the variation per second voltage of a CR timing circuit adapted to operate in accordance with the photographing requirements other than the intensity of the light from the object which is photographed such as, for example, the size of the diaphragm aperture. The information is stored in a manner similar to that which can be achieved with signals received by light meters on which light impinges exteriorly to the objective, and no additional operations such as logarithmic conversion of the information signal is required with the structure of the invention. Furthermore, the structure of the invention is arranged in such a way that the time during which the storage capacitor 7 for storing the information is charged is under the control of the integrating circuit which includes the photosensitive conductor 1 which is adapted to operate in response to the intensity of the light from the object which is photographed, resulting in the fact that no bleeder circuit is required for storage of information and the connection to the source of power is required only during the actual time required for receiving light from the object. This factor enables the source of power to be conserved as well as to simplify the switching mechanisms.

Particularly, in accordance with the invention, the value of the exposure time is determined by the information in the storage capacitor for which the duration of charging is under control of the integrating circuit which includes the photosensitive element 1 and adapted to operate in response to light impinging on element 1 from the object which is photographed so that the exposure time which is determined with the structure of the invention can extend over a wide range of light intensities from the object which is photographed. This particular advantage is of great significance in order to provide a structure which is of great utility.

What is claimed is:

1. In a camera, storage circuit means for storing exposure-determining information at least part of which includes the factor of the intensity of the light received from the object which is photographed, said storage circuit means including a storage capacitor, a charging circuit electrically connected with said storage capacitor for charging the same, and a timing circuit electrically connected in parallel with said storage capacitor for determining the duration during which the latter is charged, said timing circuit including a light-responsive means for providing at said storage capacitor a charge in accordance with said light intensity, a timing capacitor in series with said light-responsive means, and a transistor connected to the junction of said timing capacitor and light-responsive means for becoming conductive when said timing capacitor is charged to a given extent and for then interrupting charging of said storage capacitor, shutter-actuating means for first opening a shutter of the camera to commence an exposure and for then closing the shutter to terminate the exposure, shutter circuit means electrically connected with said shutter-actuating means for responding to opening of the shutter thereby to measure exposure time and for providing at said shutter-actuating means a shutter-closing operation after elapse of an exposure time which will provide a proper exposure for the conditions under which the exposure is made, said shutter circuit means including a triggering capacitor for triggering said shutter circuit means to provide said shutter-closing operation by said shutter-actuating means in accordance with the charge of said triggering capacitor, and control circuit means electrically connected between said storage capacitor of said storage circuit means and said triggering capacitor of said shutter circuit means for controlling the latter to terminate an exposure in accordance with the information stored in said storage circuit means.

2. The combination of claim 1 and wherein a manually operable means is operatively connected with said storage circuit means for closing the latter to initiate an exposure.

3. The combination of claim 1 and wherein said shutter circuit means includes transistors which when triggered operate said shutter-actuating means to close the shutter, and said triggering capacitor triggering the transistors of said shutter circuit means to bring about closing of the shutter, said timing circuit of said storage circuit means being electrically connected with said storage capacitor for maintaining the charging thereof for an interval the magnitude of which is in accordance with said light intensity.

4. The combination of claim 3 and wherein said control circuit means is operatively connected between said capacitors for triggering said shutter circuit means by said triggering capacitor thereof when the charge of the latter is equal to the charge of said storage capacitor.

5. The combination of claim 4 and wherein said control circuit means has a transistor and an output terminal connected to the emitter of said transistor, said shutter circuit means having a triggering transistor provided with an emitter electrically connected with said output terminal, and an emitter resistor also connected electrically with sad output terminal and being common to said control and shutter circuit means.

6. The combination of claim 3 and wherein a pair of variable resistors are electrically connected in series with said capacitors, respectively, for introducing into said circuits additional exposure-determining factors of film speed and diaphragm aperture.

7. The combination of claim 3 and wherein said control circuit means is a comparison circuit for comparing the charges of said capacitors for triggering said shutter circuit means through said triggering capacitor according to the differential between the charges at said capacitors.

8. The combination of claim 3 and wherein a diode, additional capacitor, and variable resistor are connected electrically on the one hand with said storage capacitor and on the other hand with said triggering capacitor for forming circuits where the electrical signals are directly proportional to time with said variable resistors being adjustable for addition of exposure factors other than the intensity of light received from the object which is photographed.

9. The combination of claim 1 and wherein said storage circuit means includes a timing portion for operating said storage circuit means for a given time and said storage circuit means storing at said storage capacitor a plurality of pulses the number of which is indicative of the light intensity, said control circuit means bringing about triggering of said shutter circuit means through said triggering capacitor in accordance with the number of pulses stored at said storage capacitor.

10. The combination of claim 3 and wherein said storage capacitor receives its charge just prior to opening of the shutter to initiate operation of said shutter circuit means, said storage circuit means including a relay which terminates operation of said storage circuit means just prior to opening of the shutter by said shutter-actuating means.

* * * * *